April 20, 1937.  G. POWELL  2,077,642
AXLE DRIVE
Filed Feb. 9, 1934  4 Sheets-Sheet 4
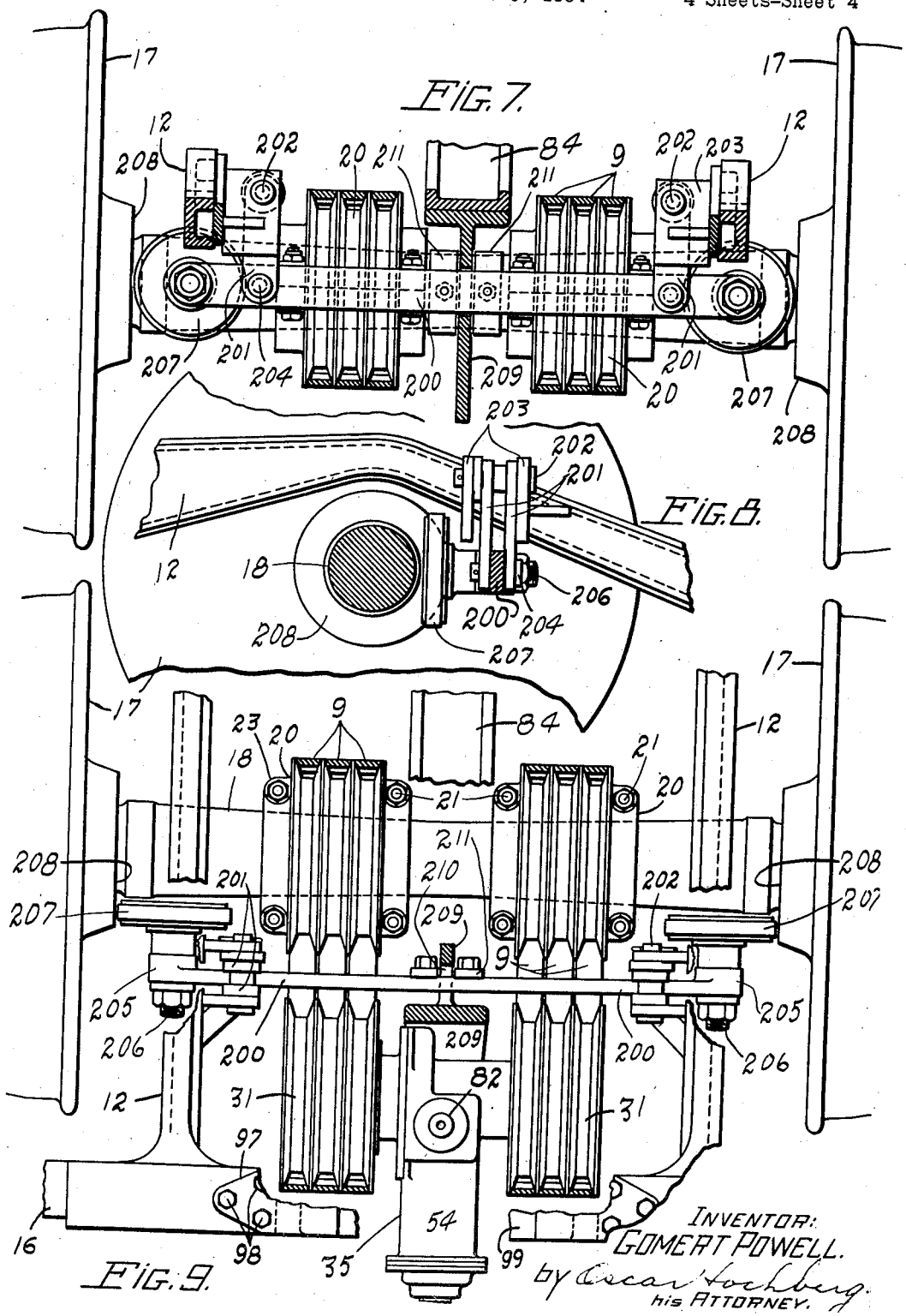

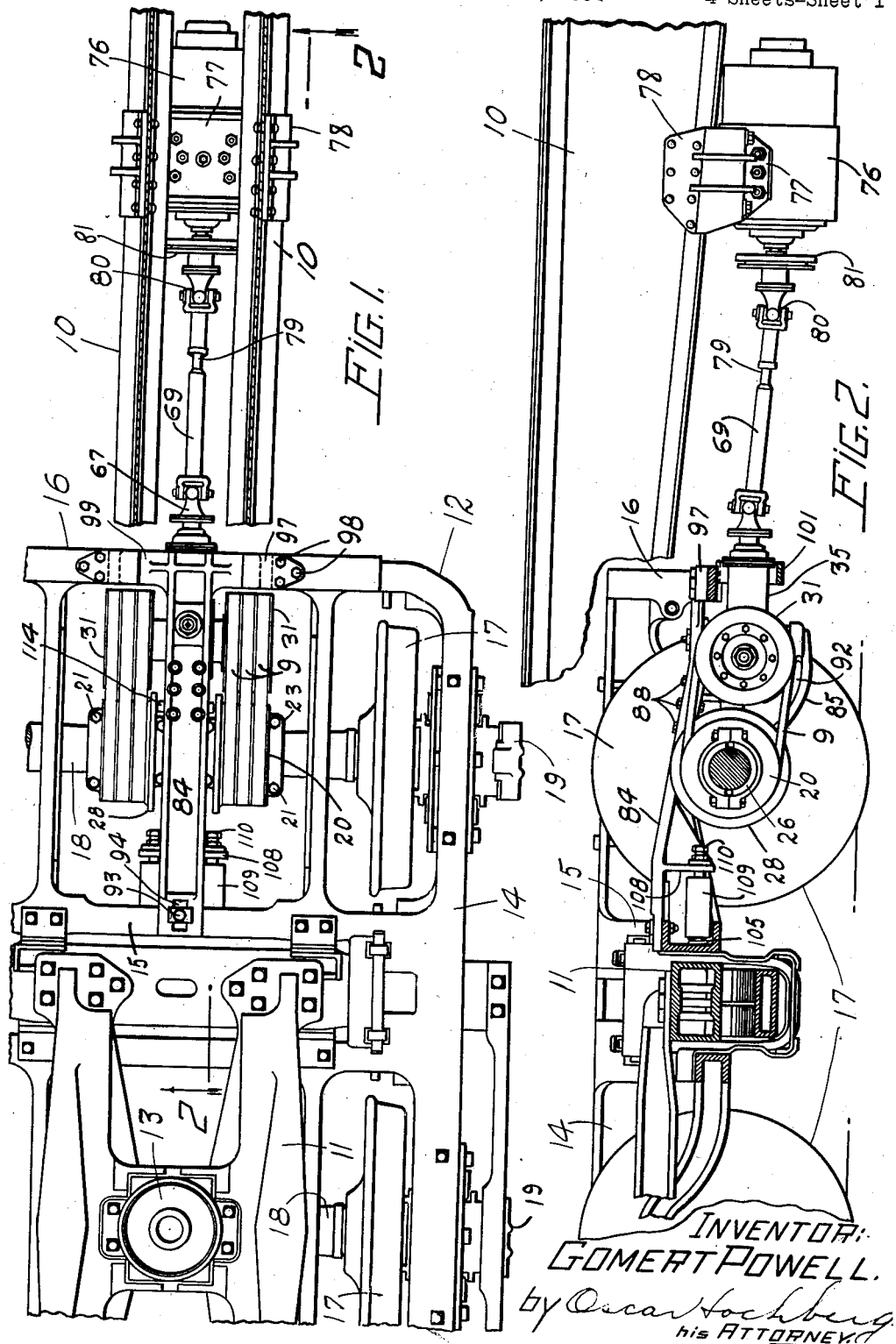

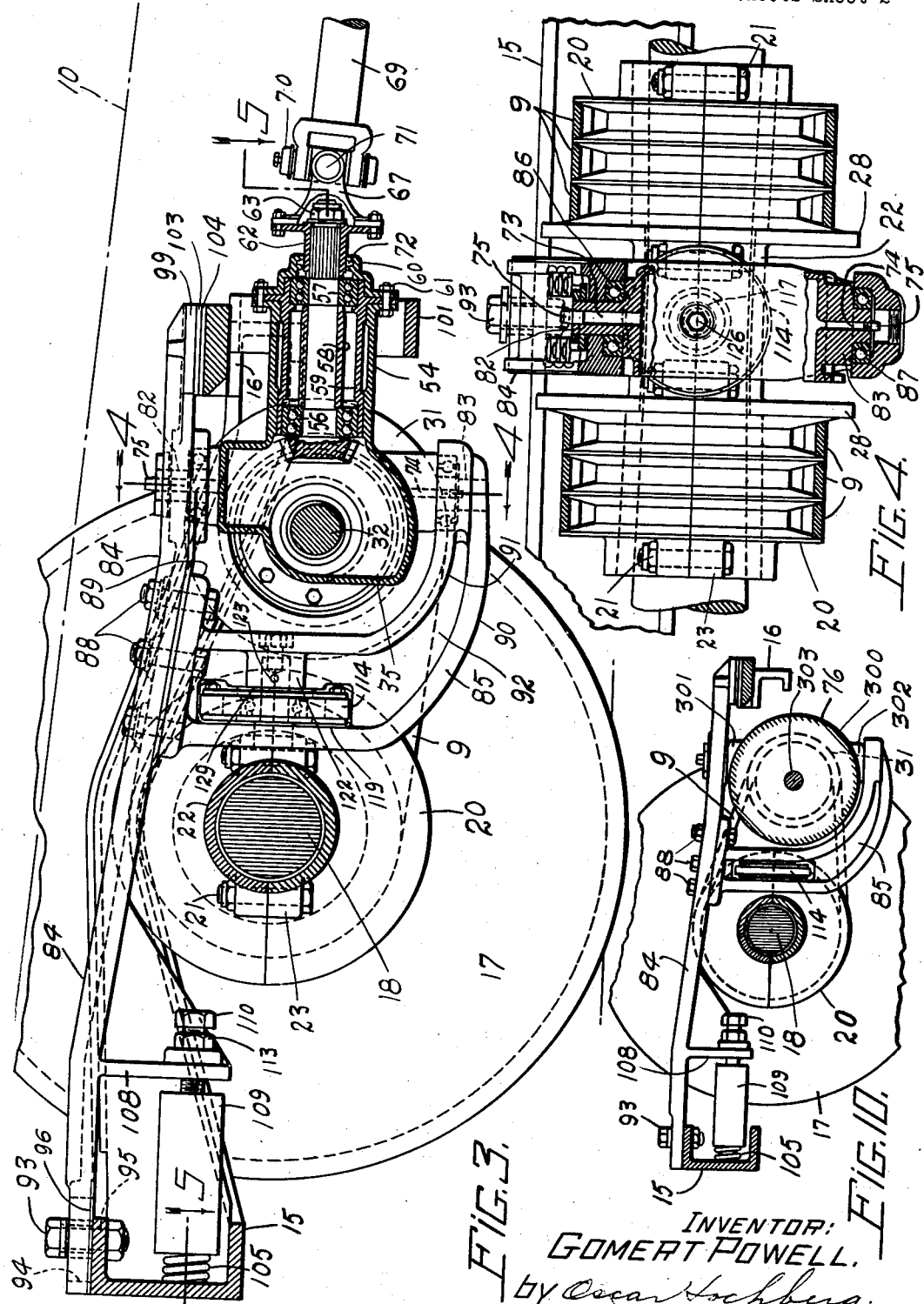

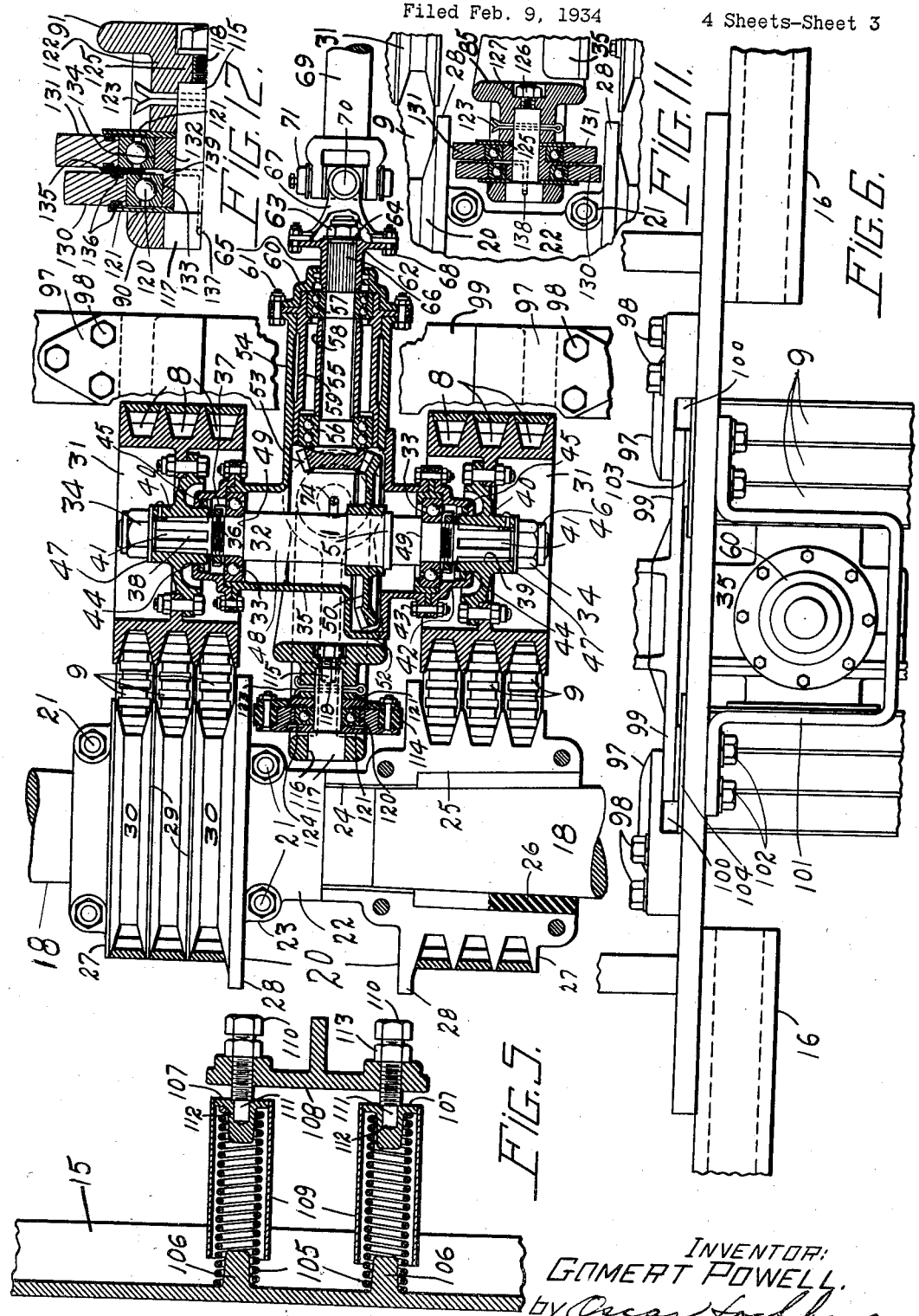

Patented Apr. 20, 1937

2,077,642

UNITED STATES PATENT OFFICE 2,077,642

AXLE DRIVE

Gomert Powell, Michigan City, Ind., assignor to Pullman-Standard Car Manufacturing Company, Chicago, Ill., a corporation of Delaware Application February 9, 1934, Serial No. 710,399

25 Claims. (Cl. 105—102)

This invention relates generally to devices for transmitting the power of a rotating car axle to a member to be driven on the truck or body of a railway car.

The principal object of the invention is to maintain substantial parallelism between the driven member and the car axle whereby the use of flexible multiple drive connections between them becomes practicable.

A further object is to provide means actuated by the axle for distributing the driving stresses upon the axle and driven members and the connections between them and render such driven members immediately responsive to axle movement.

An important object is to provide an axle driven assembly pivotally mounted within a supporting member yieldably held upon the truck frame, a plurality of flexible connections between the assembly, and a car truck axle, so that the assembly, controlled by the axle, will function as a unit to maintain a balanced connection with the axle independently of the movement of the axle with respect to the truck frame.

Another object is to provide a driven member movably supported from the truck frame and flexibly connected to a car truck axle with means on the truck frame for resiliently holding the driven member spaced from but responsive to movements of the axle.

The foregoing and other objects are obtained by the mechanism illustrated in the drawings accompanying this specification, in which—

Figure 1 is a general plan of a railway car truck equipped with the invention which, in the present embodiment, is designed to drive a transmission supported on the truck and yieldably connected to a generator on the car body;

Figure 2 is a vertical sectional view thru the car truck taken on line 2—2 of Figure 1 showing the general application of the invention in side elevation;

Figure 3 is a similar view on a larger scale but showing certain parts of the transmission and casing broken away the better to illustrate the disposition of the driven counter-shaft with respect to the vertical swiveling axis of the casing;

Figure 4 is a vertical section transversely of the floating supporting member taken on line 4—4 of Figure 3 showing the method of mounting the swiveling transmission member with the upper and lower trunnions of the casing journaled respectively in the beam and depending arm portions of the supporting member, the intermediate portion of the casing with counter-shaft and pulleys of the swiveled assembly being removed to show the driving pulleys on the axle and the shifting device on the supporting member in position to be engaged by one or the other of the axle pulleys during endwise thrust movements of the axle;

Figure 5 is a horizontal sectional view thru the drive assembly and portions of the truck frame taken on line 5—5 of Figure 3 showing the axle and driven pulley mounting and one form of shifting device journaled in the floating supporting member and equalizing springs for maintaining and distributing the tension in the connecting belts and to restore the driven assembly to its normal position after it has been shifted by the thrust movements of the axle;

Figure 6 is an end elevational view of the end of the truck frame with the end of the floating supporting member loosely mounted upon the truck to permit lateral shifting of the driven pulley assembly in response to axle movement;

Figure 7 is a view similar to Figure 4 showing a modified form of shifting device in which the end thrust of the axle is communicated to the floating supporting member by means swung from the truck frame and actuated by contact with one or the other of the pair of wheels on the axle;

Figure 8 is a view similar to Figure 3 of the modification illustrated in Fig. 7, showing the relation of the floating member shifting means and axle;

Figure 9 is a plan view of the same showing the relation of the shifting means and the pulley assembly;

Figure 10 is a view similar to Figure 3 of another modification showing the substitution of a generator for the transmission and casing of the first embodiment, the generator being fitted with pulleys and mounted for swiveling upon the floating member and driven from the axle;

Figure 11 is a view similar to Figure 5 showing another form of shifting device in which two discs are journaled upon the floating member and offset one from the other for engagement respectively with one of a pair of respectively adjacent pulleys on the axle; and Figure 12 is a similar view showing in enlarged fragmentary detail the method of assembling the offset discs of the shifting device with a common journal bearing having offset axes and means for sealing and lubricating the journals.

The invention overcomes the objections to the use of multiple belt drives hitherto obtaining and provides for constant and positive alinement of the belts between driving and driven pulleys. The belts are prevented from being overstressed by the compensating action of the swiveling equalizing driven pulleys mounted on a floating member on the car truck frame and designed to shift their positions in response to the gyrations of the axle. The capacity to preserve throughout such movements of the axle a parallel and registered relation between the axle and its pulleys and the countershaft and the pulleys thereon. whereby objectionable angularities between belts and pulleys are avoided, is the outstanding feature of the assembly.

In the drawings, 10 represents a pair of longitudinal sills of a car body normally supported upon cushioned bolster 11 mounted upon truck 12 adapted for swiveling movement with respect to the car body by means of the center bearing plate 13 on the bolster 11 having pivotal engagement with a companion bearing on the body. The truck is fitted with the conventional frame having the customary side sill portions 14 connected by transom members 15 and at their ends by sills 16. The truck is fitted with wheels 17 mounted upon axles 18 carrying suitable journal boxes 19 for supporting the truck frame. The form of truck illustrated is of a standard six-wheel design but the invention may be adapted to trucks having one or more axles or pairs of wheels as will presently appear.

As best shown in Figures 1 to 5, the axle 18 is fitted with the driving element of the invention which, in the preferred embodiment, is in the form of a pair of pulleys 20 split along their axial planes for ready application to and removal from the axle, the pulley sections being held together by means of bolts 21. The pulleys 20 are preferably united by an intermediate sleeve portion 22 also split along its axis and formed integral with the respective pulley sections as best shown in Figures 3, 4 and 5. Both pulleys and connecting sleeve are formed with attaching flanges 23 pierced to receive the clamping bolts 21.

The pulleys and connecting sleeve are formed to provide ample clearances between them and the axle body as shown at 24 and 25 respectively. Within the spaces 25 about the axle at the pulley positions are interposed cushion segments 26 of rubber or the like to provide a positive though resilient driving connection between axle and pulleys to prevent relative creep or slippage at driving torques. The pulleys 20 are formed with peripheral end flanges 27 and 28 and intermediate annular flanges 29 to provide a plurality of circumferential grooves 30 between them, the inner end flanges 28 being preferably larger than and projecting beyond the other flanges of the respective pulleys for a purpose hereinafter described.

Thus secured to the axle, the pulleys 20 rotate with and move otherwise with the axle and function to drive and hold in positive alinement the pulleys 31 mounted upon countershaft 32 journaled in roller bearings 33 enclosed with said shaft within casing 35. The bearings are secured by retaining nuts 36 threaded upon the shaft and held against rotation by lock washers 37 engaging shaft and nut. The ends of the shaft are tapered as at 38 and fitted snugly within the tapered bore 39 in hub 40 of respectively adjacent pulleys 31 to which the shaft is held for rotation with the pulleys by locking keys 41. The casing is closed at its ends by heads 42 removably secured to the casing by bolts 43. The heads are formed with openings 44 designed to closely receive hubs 40 of adjacent pulleys 31 to prevent escape of lubricant from the casing, the joint being further sealed against lubricant seepage by means of any suitable packing 45 about the pulley hub portions 40 projecting within the heads 42 as best shown in Figure 5. The pulleys are securely held upon the shaft 32 by fastening nuts 34 threaded upon the shaft ends and held from rotation by lock nuts 46, suitable washers 47 being interposed between the hubs 40 of the pulleys and the nuts 34 to cover the ends of the hubs and provide ample bearings for the nuts.

The shaft 32 between the bearings 33 is formed with a thickened portion 48 providing abutment shoulders 49 at the bearings further to prevent endwise movement of both bearings and shaft. The shaft is also fitted with a beveled driving gear 50 keyed for rotation with the shaft and held from endwise movement on the shaft by abutment collar 51—the gear being adapted for meshing with a pinion on a propeller shaft assembly hereinafter mentioned. The casing 35 at the driving gear position is bulged circumferentially as at 52 to accommodate the gear and to provide a suitable receptacle for the gear lubricant into which the gear dips as it rotates and carries it to the engaging pinion. Thus assembled, the shaft, pulleys, casing, bearings and gear are ruggedly held in compact operating relation and sealed against the elements and loss of lubricant.

The driving gear 50 transmits the power of the countershaft 32 to pinion 53 forming part of an assembly removably mounted, in the present embodiment, within an extension 54 projecting from one side of casing 35 as best shown in Figs. 3 and 5. The pinion 53 is preferably formed with stub shaft 55 supported in roller bearings 56 adjacent the pinion to take the direct thrust of the driving gear 50 and a smaller roller bearing 57 adjacent the opposite end of the shaft stressed only to the degree required to hold the shaft in alinement so that the pinion will at all times present a proper working angle to the driving gear 50. The roller bearings are held in their respective positions upon the shaft 55 by an intermediate spacing thimble 58 and the whole mounted within an enclosing sleeve 59 removably entered in the casing extension 54 and secured by a retaining head 60 held to the casing by bolts 61.

The shaft 55 extends beyond bearing 57 for connection with a universal joint member 62 held to the shaft by nut 63 bearing against a washer 64 closing the shaft opening in hub 65 of the joint member 62 as shown in Figures 3 and 5. The shaft is splined on its protruding end as at 66 and entered in hub 65 of the joint member and locked for simultaneous rotation, the joint member being removably secured to companion joint member 67 by bolts 68 or the like, member 67 in turn being pivoted to propeller shaft 69 by pins 70 and 71 having bearings at right angles to each other to provide universal movement of gear and propeller shafts, but any approved universal joint at this position may be substituted for the one indicated, if desired. Closure head 60 is preferably formed to accommodate a lubricant seal 72 at the joint between it and adjacent hub portion 65 of joint member 62. The casing is charged with lubricant introduced through upper port opening 73 and drained through lower opening 74 as shown in Figure 4, the feed port and drain openings being closed by suitable plugs 75 as in common practice. As best shown in Figures 1 and 2, the propeller shaft 69 extends longitudinally of the car beneath the sills 10 for connection with a driven unit which for the purpose of disclosure is shown as a generator 76 supported upon brackets 77 removably held in fixed supports 78 secured to the sills. The shaft is formed with the usual slip-joint 79 to provide for variation in the length of the shaft during swiveling movements of the truck 12 and fitted with a second universal joint 80 adjacent the generator and a friction clutch member 81 between the generator and the joint to avoid a too sudden stoppage of the generator during abrupt changes in car speed caused by impacts above coupling speeds and breaking operations or acceleration in speed of the train.

The casing 35 is provided with upper trunnion 82 and lower trunnion 83 with their axes vertically arranged to permit horizontal swiveling of the casing with its contained shaft and gear elements. The upper and lower trunnions, respectively, are journaled in a floating supporting bar 84 and a bracket 85 depending from the bar between which the casing may turn in response to the movements of the axle to the end that the countershaft will at all times remain parallel to the axle to equalize the stresses imposed on the connecting belts, as will presently appear. As best shown in Figure 4, both upper and lower trunnions 82 and 83 are supported respectively in roller bearings 86 and 87 seated in supporting bar 84 and the bracket 85, and within said trunnions are formed the charging and draining openings 73 and 74 above noted.

The gear casing is held between the bar 84 and bracket 85 and may be removed by removing the bracket from the bar to which it is held by bolts 88, though, conceivably, the bracket 85 may be made integral with the bar 84 and one or both trunnions on the casing may be made removable to permit removal of the casing. In the present embodiment, the bracket 85 is made L-shape and of substantially I-beam configuration in cross-section as shown in Figures 3, 5, 11 and 12, the vertical leg of the bracket being formed with an attaching flange 89 perforated to receive the securing bolts 88 taking the supporting bar 84, and the other leg 90 of the bracket projecting horizontally to provide a support for the gear casing, as best shown in Figures 3 and 4.

The bracket 85 is formed along its edges with marginal flanges 90 and 91 connected by intermediate web 92 to provide necessary rigidity in the bracket for supporting the load imposed by the weight of the gear mechanism in casing 35 and the stress resulting from the thrust of the propeller shaft 69 during swiveling movements of the truck and gyrations of the axle. The bolts 88 holding the bracket to floating bar 84 are sufficient in size and number to removably maintain the bracket in rigid relation to the bar and permit dismantling of the bracket for removal of the gear casing for replacement or repair of the gear or pulley assembly.

The movable supporting bar 84 is of sufficient strength to carry the bracket and imposed load and extends between the transom 15 or other anchorage on the truck frame and the end sill 16. One end of the bar is slidably supported upon the transom 15 and secured to the upper side thereof by bolt 93 extending thru and rigidly held in the transom and thru an elongated opening or slot 94 in the bar, the transom being perforated as at 95 to receive the bolt which thus serves to permit swiveling and limited longitudinal movements of the bar. The bar end at the transom position is fitted upon its underside with a lubricating plate 96 providing a renewable bearing surface for the bar and minimizing wear on the transom. The floating bar 84 is also movably held at the end sill position to permit longitudinal and a limited lateral movement by means of brackets 97 removably secured to the end sill 16 by bolts 98 and formed to overlie respectively adjacent wings 99 extending laterally from the bar, ample clearance spaces 100 being provided between the ends of said wings and the body of the brackets 97 for lateral movement of the bar in response to the shift of the axle. To prevent dropping of the casing 35 due to possible failure of the supporting means, a safety loop 101 is secured to the end sill by bolts 102 so as to underlie the casing extension 54 in position to support the assembly until proper replacement or repairs can be made. The supporting bar wings 99 may also be fitted with lubricating bearing plates 103 and the end sill with steel rubbing plates 104 to minimize wear between the moving bar and end sill.

The driving axle pulleys 29 are connected with driven pulleys 31 by endless belts 9 arranged in multiple within respective grooves 30 of the axle pulleys and 8 of the driven pulleys, as best shown in Figures 1 thru 5. The belts are held taut by means of springs 105 supported, in the present embodiment, against the transoms 15 upon dowel seats 106 and upon dowel seats 107 adjustably mounted within abutment bracket 108 depending from the floating bar 84. The springs 105 are protected from dirt and flying cinders by casings 109 held in spaced concentric relation with the springs by the dowel seats 107 as shown in Figure 5. The movable dowels are adjusted by screw bolts 110 threaded into the bracket 108 and provided with dowel engaging studs 111 rotatably entered in bearing openings 112 in the dowels so that when the screw bolts are rotated in one direction the dowel seats 107, with their respective casings 109, are caused to move toward the transom 15 to compress the springs and further stress the belts 9 by the resultant thrust upon the floating bar 84 thru depending bracket 108 and consequent movement of the bar and the transom and end sill of the truck frame 12. The reverse rotation of the bolts will permit expansion of the springs 105 upon retraction of dowel seats 107 and cause a lessening of the tension upon the several belts 9. The bolts 110 may be locked against rotation by locknuts 113 or in any other approved fashion.

As previously noted, the trunnions 82 and 83 providing the vertical axis for the swiveling casing 35 are in a plane beyond the axial plane of countershaft 32 upon which the driven pulleys 31 are mounted, wherefore the countershaft would move in an orbit horizontally about the vertical axis of the trunnions in response to shifting movements of the axle thru the medium of the belts 9 connecting the driving and driven pulleys. The thrust of springs 105 would thus tend to center the floating bar 84 when the axle has assumed its normal position to prevent excessive lateral vibration of the casing and the propeller shaft connections 62 and 67 and avoid objectionable angularities between gear and propeller shafts and maintain at all times the necessary parallelism between countershaft 32 and axle 18 uniformly to distribute the thrust of axle movement among the several belts to avoid unduly straining any one of them.

To prevent biasing of the several belts with respect to axle pulleys 20 and driven pulleys 31, the grooves 30 of the former and 8 of the latter pulleys are held in positive alinement under all conditions of axle movement lengthwise of the axle 18 by means of rollers journaled in bracket 85 depending from the floating bar 84. In the form indicated in Figures 1, 3, 4, 5 and 10, a single disc 114 is mounted on a fixed bearing pin 115 removably held with a driving fit in opening 116 extending thru flanges 90 and 91 of bracket 85. The opening in flange 90 of the bracket is preferably round to receive correspondingly shaped head 117 of the pin 115, the shank portion of which is provided with a reduced threaded portion 118 extending thru abutment wall 125 inwardly of flange 91 of the bracket.

The web portion 92 of the bracket is provided with an opening 119 large enough to receive roller disc 114 with its ball bearing 120 and washers 121 as shown in Figure 5. The web portion of the bracket constituting the bearing 122 for the shank of the pin extends from one side of the disc opening 119 to the flange 91. The pin is held from displacement by cotter pin 123 extending thru pin and bearing, the pin 115 being adapted, when assembled, to permit tightening together of the inner race of roller bearing 120 and washers 121 held fixed to the pin.

The rotatable portion of the disc is fitted with the outer race or ball bearing 120 with clearance spaces 124 between it and the fixed washers 121 upon opposite sides thereof to insure free movement of the disc. The assembling of the bearing race and washers secured to the pin 115 is effected initially by forcing the pin thru assembled washers and inner race having a pressed fit upon the pin. The head 117 is held against adjacent washer 121 by securing nut 126 in recess 127 in flange 91 so that the pressure of head 117 will be communicated thru washers 121 and intermediate inner ball race against abutment 129 on bearing 122 of the bracket web 92.

As shown in Figures 1, 3, 4, 5 and 10, the disc 114 is disposed between the axle pulleys 20 in position to engage one or the other of end flanges 28 on the pulleys to shift supporting bar 84 together with the driven pulley and gear casing unit in response to axle thrust to maintain the pulley and belt alinement previously noted.

Instead of the single disc 114 to effect the required shifting of the driven assembly, two discs 130 and 131 may be employed as shown in Figure 11 and on a larger scale in Figure 12. It may be desirable to use the double disc arrangement to avoid the frequent reversal of rotation of the single disc 114 caused by contact with one or the other of the rotating pulley flanges 28 and consequent wear on pulleys and disc since the single disc is subjected to a violent spinning impetus in one direction by one of the pulleys only to be arrested upon contact with the other pulley and spun in the opposite direction. On the other hand, the use of two discs would subject each to the action of the pulley adjacent to it independently of the action of the companion pulley and the other disc. Obviously, the use of separate discs for each of the pulleys will effect substantial reduction in size and movement of the respective discs 130 and 131 and resultant wear upon their bearings, permitting the mounting of both upon a common journal 132 as clearly shown in Figure 12.

The journal 132 is formed with bearings 133 and 134 offset with respect to each other to provide separate axes of rotation for the discs 130 and 131 in different vertical planes so that with discs of the same diameter the periphery of one of them will protrude beyond that of the other disc which, upon the opposite side, will extend beyond the periphery of the first disc as best shown in Figure 11 in which the protruding disc 130 on one side of pin 115 will be closer to pulley flange 28 on that side than companion disc 131 and will be the one to be engaged by adjacent pulley. The same is true with respect to disc 131 which, upon the opposite side of the pin, is closer to adjacent pulley flange 28 than its companion disc 130 and will be the one engaged by the pulley on that side. The discs 130 and 131 are not eccentrically mounted and do not move in an orbit about the pin center but rotate about bearings 133 and 134 fixed to the pin.

The journal 132 is preferably formed with an annular fin portion 135 between the offset bearings 133 and 134 and the inner races of ball bearings 120 pressed on the bearings 133 and 134 and separated by the fin 135 designed to provide sufficient clearance between the rotatable portions of discs 130 and 131 as shown in Figure 12. Washers 121 are mounted upon pin 115 at the ends of journal 132 and together with the journal and assembled discs are held within opening 119 in web 92 of the bracket 85 and the pin 115 driven therethrough with the shank portion of the pin in bearing 122 with a driving fit against abutment wall 125. The pin is held from creeping by the reduced shank portion 118 extending thru the abutment wall and fitted with securing nut 126 in recess 127 in the bracket flange 91.

To prevent the entrance of dirt to the ball bearings 120, the opposite faces of the rotatable discs 130 and 131 are fitted with rings of felt 136 let into annular grooves in the discs and adapted to bear against adjacent faces of the relatively fixed washers 121 and intermediate separating fin 135 to seal the joints between them, all as shown in Figure 12. Suitable provision is made for lubricating the bearings 120 by means of oil groove 137 in the head and shank portions of pin 115 communicating with oil port 138 in flange 90 of the bracket 85 and groove 139 in journal 132 open to the ball bearings 120.

A modified form of shifting mechanism is shown in Figures 7, 8 and 9 in which the supporting bar 84 is shifted by means of a crossbar 200 extending transversely of the truck between the axle driving pulleys 20 and the driven pulleys 31 and between upper and lower reaches of the belts 9 and suspended for lengthwise movement by hanger links 201 pivotally secured by pins 202 to brackets 203 on the truck frame 12 and to the bar by pins 204. In the form shown, the bar 200 extends with its ends beyond the respective points of connection with hanger links 201 and fitted with journal bearing portions 205 adapted to receive shafts 206 supporting rollers 207 in position to be engaged by hub portions 208 of wheels 17 on axles 18. The movable supporting bar 84 is provided with a depending bracket 209 perforated as at 210 to receive the crossbar 200. The crossbar adjacent the bracket 209 is provided with thrust blocks 211 positioned upon opposite sides of the bracket so that, in operation, the thrust of one of the wheels upon adjacent rollers 207 will cause the bar 200 to swing inwardly to effect engagement between the nearest thrust block 211 and adjacent side of bracket 209 and force the supporting bar 84 and with it the driven pulleys 31 to respond to thrust movements of wheel and axle to thereby maintain positive alinement of the belts 9. In respect to the mounting of the supporting bar 84 and support of the driven pulley unit 31, the organization is the same as that depicted in Figures 1 thru 6.

Certain operating conditions may permit the installation of the generator 76 upon the truck and mounting it in the fashion prescribed for the driven gear assembly of Figures 1 thru 6. As shown in Figure 10, the generator 76 is provided with a casing 300 having upper trunnions 301 and lower trunnions 302 arranged in vertical alinement axially for swiveling movement in a horizontal plane between supporting bar 84 and depending bracket 85, the trunnions being seated in bearings 86 and 87 in bar 84 and bracket 85, respectively, in the manner substantially as indicated in Figure 4 for the mounting of the gear case trunnions.

The generator is equipped with the usual armature shaft 303 which, for present purposes, is extended to accommodate pulleys 31 fitted to the shaft ends on opposite sides of the generator. The pulleys 31 and the generator armature shaft 303 are driven by pulleys 20 on axle 18 by means of connecting belts 9 precisely as indicated for the driving of the gear assembly indicated in Figures 1 thru 6. The generator 76, in such installation, would respond to the thrust of the axle and move with the supporting bar 84 when actuated by contact of driving pulleys 20 with roller disc 114 on bracket 85. The axis of the generator is held parallel to the axle and the belts taut by the stress of springs 105 at the transom position whereby positive alinement between driving and driven elements is at all times maintained to the end that the driven pulleys 31 and generator 76 will be immediately responsive to gyrations of the axle and the stress on the belts distributed uniformly.

As in the swivel mounting of the gear casing 35 shown assembled in Figures 3, 4 and 5, the armature shaft 303 with its pulleys 31 is held parallel with the axle 18 and the pull on the belts and pulleys equalized by the drag or belt pull caused by the axle on the driven pulleys and countershaft positioned to the rear of the vertical axis of the swiveling member on the beam 84 subjected to the opposing thrust of springs 105 which insures positive alinement of the pulleys to prevent angling of the belts in the pulley grooves.

What is claimed is:

1. In a drive having a primary driving element and a driven member, driving belts connecting them, means movably supporting said driven member, and means on said driving element cooperating with the supporting means for moving said driven member.

2. In an axle drive for vehicle trucks including a pair of wheels and a connecting axle constituting a driving element, a driven member, driving belts connecting the driven member and said driving element, supporting means for the driven member movably mounted on the truck, and means on said driving element cooperating with said supporting means for moving said driven member.

3. In a vehicle truck including a pair of wheels and a connecting axle, a driving element on the axle, a driven member, driving belts uniting said driven member and the driving element, supporting means for the driven member movably mounted on the truck, and coacting mechanism on said driving and supporting means for shifting the driven member in response to endwise movement of the axle.

4. In a vehicle truck including a frame supported from a live axle, a beam movably supported on the frame, driving pulleys on said axle and pressure springs operably engaging the beam and frame, a driven unit pivoted upon said beam for swiveling about a vertical axis and involving a plurality of pulleys in parallel operating alignment with the pulleys on the axle, and driving belts connecting said driving and driven pulleys and cooperating with said pressure springs and beam for keeping the driven pulleys at a relatively constant distance from the driving pulleys, said driven pulleys being movable in orbits laterally of the vertical axis of the unit.

5. In a vehicle truck including a frame supported from a live axle, a beam movably supported on the frame and pressure means resiliently engaging the beam and frame, a driven unit pivotally mounted on said beam for swiveling movement about a vertical axis, and flexible driving connections uniting said unit and driving axle and cooperating with said pressure means and beam for keeping the driven pulleys at a relatively constant distance from the driving pulleys.

6. In a vehicle truck supported from live axles, a driving element on one of the axles, a driven member, flexible driving connections uniting the driven member and said driving element, supporting means for the driven member movably mounted on the truck, coacting mechanism on said driving and supporting means for shifting the driven member in response to endwise movement of the axle, and separate means resiliently engaging said movable supporting means and said truck for centering the driven member.

7. An axle drive comprising a vehicle truck supported from rotating axles, a driving element on one of the axles, a driven member having flexible driving connection with the driving element, supporting means for the driven member movable transversely and longitudinally upon the truck, coacting mechanism on said driving and supporting means for shifting the driven member in response to endwise movement of the axle, and pressure devices resiliently engaging the supporting means and said truck independently of said coacting mechanism for centering the driven member.

8. In a vehicle truck including framing members supported from a live axle, a supporting beam movably mounted upon said framing, a driven member carried by said beam, a driving member on the axle, coacting mechanism on said driving member and beam for shifting said driven member, pressure means operably engaging said beam and framing members to center the driven member, and flexible driving connections uniting said driving and driven members and cooperating with said pressure means and beam for keeping the driven pulleys at a relatively constant distance from the driving pulleys.

9. In a vehicle truck including a frame supported from a live axle, a beam movably supported on the frame, a driving member on the axle, a driven member pivotally mounted on said beam, coacting mechanism on said driving member and beam for shifting the driven member, pressure means operably engaging said beam and truck frame to center the driven member, and flexible driving connections uniting the driving and driven members and cooperating with said pressure means and beam for keeping the driven pulleys at a relatively constant distance from the driving pulleys.

10. In a vehicle truck including a frame supported from a live axle, a beam movably supported on the frame, driving pulleys on said axle, pressure springs operably engaging said beam and truck frame, a driven unit carried by said beam pivoted for swiveling about a vertical axis, a countershaft journaled in said unit intermediate the axle and the said vertical axis of the unit, driven pulleys on the countershaft, driving belts uniting said driving and driven pulleys and adapted under thrust of the pressure springs to equalize the stresses on said pulleys, and coacting mechanism on said beam and axle for shifting said unit.

11. In a vehicle truck including a frame supported from a live axle, driving pulleys on said axle, a beam movably supported on the frame and pressure springs operably engaging the beam and truck frame, a driven unit pivotally mounted on said beam for swiveling about a vertical axis and including a plurality of driven pulleys mounted on a shaft journaled in the driven unit, the axis of said shaft being located intermediate said axle and the said vertical axis of the unit, driving belts uniting said driving and driven pulleys and cooperating with said pressure springs and beam for keeping the driven pulleys at a relatively constant distance from the driving pulleys, and coacting mechanism on said beam and axle for shifting said unit.

12. In a vehicle truck including a frame supported from a live axle, a beam responsive to endwise movement of the axle supported on said frame, a driven unit carried by the beam, and coacting mechanism on said beam and axle for shifting said unit.

13. In a vehicle truck including a frame supported from a live axle, a beam responsive to endwise movement of the axle supported on said frame, a driven unit pivotally mounted on said beam, and coacting mechanism on said beam and axle positively to shift said unit in response to endwise movement of the axle.

14. An axle drive for a vehicle truck having a live axle and a supporting frame, comprising a beam movably mounted on the frame above the axle and provided with roller mechanism adjacent the axle, spaced pulleys on said beam, juxtaposed pulleys spaced apart on said axle at opposite sides of said roller mechanism and adapted upon thrust of the axle to engage the roller mechanism and move said beam, and flexible driving connections uniting said axle and beam pulleys.

15. In a vehicle truck including a live axle and a supporting frame, driving pulleys spaced apart on said axle, a beam movably supported on said frame and provided with a depending extension adjacent the axle intermediate said pulleys, a driven unit carried by said beam, beam actuating mechanism on said extension for shifting said unit comprising a plurality of discs engageable respectively with respectively adjacent pulleys, a journal fixed against rotation common to said discs and formed with bearings offset with respect to each other to provide separate axes of rotation for said discs so that the periphery of each projects beyond the overlapping zone of the companion disc, and driving means uniting said pulleys and unit.

16. In a vehicle truck including a driving axle supporting framing having sides and a connecting transom and an end sill, a beam extending between and movably supported on said transom and end sill, means on the end sill and transom yieldably securing said beam, a driven unit carried by said beam, coacting mechanism on said beam and axle for shifting said unit, driving belts uniting said unit and axle, and spring elements connecting said beam and transom for stressing said belts.

17. In a vehicle truck including a frame supported from a live axle, a beam movably supported on the frame, driving pulleys on said axle and pressure springs operably engaging the beam and frame, a driven unit pivoted upon said beam for swiveling about a vertical axis and involving a plurality of driven pulleys in parallel operating alinement with the pulleys on the axle, and driving belts connecting said driving and driven pulleys and cooperating with said pressure springs and beam for keeping the driven pulleys at a relatively constant distance from the driving pulleys, said driven pulleys being movable in an orbit substantially parallel to the longitudinal axis of the truck.

18. In a vehicle truck including a frame supported from a live axle, a beam movably supported on the frame, driving pulleys on said axle, pressure springs operably engaging the beam and frame, a driven unit pivoted upon said beam for swiveling about a vertical axis involving a plurality of pulleys in operating alignment with the axle pulleys mounted on a countershaft parallel to the axle, and driving belts connecting said driving and driven pulleys and cooperating with said pressure springs and beam for keeping the driven pulleys at a relatively constant distance from the driving pulleys, said countershaft being movable in an orbit in a horizontal plane about the vertical axis of the unit.

19. In a vehicle truck including a live axle and a supporting frame, driving pulleys spaced apart on said axle, a beam movably supported on said frame and provided with a depending extension adjacent the axle intermediate said pulleys, driven pulleys on said beam, beam shifting mechanism on said extension comprising a disc rotatably mounted within said extension and adapted to engage one or the other of said axle pulleys, and driving means uniting said driving and driven pulleys.

20. In a vehicle truck including a live axle and a supporting frame, driving pulleys spaced apart on said axle, a beam movably supported on said frame and provided with a depending extension adjacent the axle intermediate said pulleys, driven pulleys on said beam, beam shifting mechanism on said beam comprising a pair of discs rotatably mounted on said extension and engageable respectively with respectively adjacent axle pulleys, and driving means uniting said driving and driven pulleys.

21. In a vehicle truck including a live axle and a supporting frame, driving pulleys spaced apart on said axle, a beam mounted for movement upon said frame and provided with a depending extension adjacent the axle intermediate said pulleys, driven pulleys on said beam, beam shifting mechanism on the beam comprising a pair of discs engageable respectively with respectively adjacent axle pulleys and rotatably mounted upon a journal removably fixed on said extension, said journal being formed with bearings offset with respect to each other to provide separate axes of rotation for said discs, and driving means uniting said driving and driven pulleys.

22. A vehicle axle drive including a live axle and a supporting frame, driving pulleys spaced apart on said axle, a beam movably supported on said frame and provided with a depending extension adjacent the axle intermediate said pulleys, a driven unit pivotally mounted upon said extension and comprising in combination a housing, a countershaft journaled in said housing parallel to said axle, driven pulleys spaced apart and an intermediate gear wheel carried by said countershaft, a pinion normally engaging said gear and carried by a shaft journaled in the housing perpendicularly to said countershaft, a propeller shaft, a generator on said vehicle, universal joints connecting said propeller shaft to the generator and pinion shaft, coacting mechanism on said beam extension and axle pulleys positively to shift said unit in response to endwise movement of the axle, and driving means uniting said driving and driven pulleys.

23. In combination with a car underframe and a truck having an axle, a driving unit mounted on the truck and adapted for longitudinal and transverse shifting movements in a horizontal plane, pressure exerting means between the truck and driving unit, a double belt drive connection between said driving unit and axle maintained in balanced driving relation therewith by the combined action of said pressure means and the shifting of said unit, a driven unit on the underframe, and a drive shaft directly connecting said driving and driven units.

24. In combination with a car underframe and a truck having an axle, a driving unit mounted on the truck and adapted for pivotal movement with respect thereto about a vertical axis, pressure exerting means between the truck and driving unit, a double belt drive connection between said driving unit and axle balanced by the pivoting of said unit and maintained in driving relation by the action of said pressure means, a driven unit on the underframe, and a transmission shaft universally connected to the driving and driven units respectively.

25. In combination with a car underframe and a truck having an axle, a driving unit mounted on the truck and adapted for shifting movements both longitudinally and transversely thereof, pressure exerting means between the truck and driving unit, a double belt drive connection between said driving unit and axle balanced by the shifting of said unit under action of the pressure means, a driven unit on the underframe, and a transmission shaft comprising telescopically coupled sections universally connected to the driving and driven units respectively.

GOMERT POWELL.